Dec. 16, 1947.  R. M. NARDONE  2,432,582
REVERSIBLE DIRECT CURRENT MOTOR
Original Filed Sept. 24, 1942  7 Sheets-Sheet 1

Inventor
Romeo M. Nardone.
By Martin J. Finnegan
Attorney

Dec. 16, 1947.  R. M. NARDONE  2,432,582
REVERSIBLE DIRECT CURRENT MOTOR
Original Filed Sept. 24, 1942    7 Sheets-Sheet 4

Inventor
Romeo M. Nardone.
By Martin J Finnegan
Attorney

Dec. 16, 1947.    R. M. NARDONE    2,432,582
REVERSIBLE DIRECT CURRENT MOTOR
Original Filed Sept. 24, 1942    7 Sheets-Sheet 5

Inventor
Romeo M. Nardone
By Martin J. Finnegan
Attorney

Inventor
Romeo M. Nardone.
By Martin J. Finnegan
Attorney

Fig. 27.

Inventor
Romeo M. Nardone.

Patented Dec. 16, 1947

2,432,582

UNITED STATES PATENT OFFICE 2,432,582

REVERSIBLE DIRECT-CURRENT MOTOR

Romeo M. Nardone, Teaneck, N. J., assignor to Bendix Aviation Corporation, Teterboro, N. J., a corporation of Delaware Original application September 24, 1942, Serial No. 459,550. Divided and this application October 16, 1943, Serial No. 506,587

3 Claims. (Cl. 172—239)

This invention relates to driving mechanism, and particularly to driving mechanism of a selective engagement character, wherein the transmission of torque may occur through one or the other, or both, of a pair of driving units; each of which is normally in the non-driving position.

An object of the invention is to provide a novel construction and method of operation of such a driving mechanism.

A second object is to control such a driving in a manner enabling the driven load to overrun a retarding element when moving in one direction and until deenergization of the driving means, whereupon the retarding element comes into effect to control reverse movement. This is of special importance in the actuation of aircraft landing gear, the improvement of the operation of which constitutes a third object of the invention.

A fourth object is to provide yieldable clutch means of novel construction, and control means therefor adapted to regulate the clutch capacity in such manner as to maintain the torque transmitting capacity constant regardless of variations in the condition of the clutch surfaces.

Another object is to provide aircraft landing gear operating mechanism embodying various features of improvement over its prototype, as disclosed in Allen Patent No. 2,284,353, granted May 26, 1942.

These and other objects will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

Figure 6:
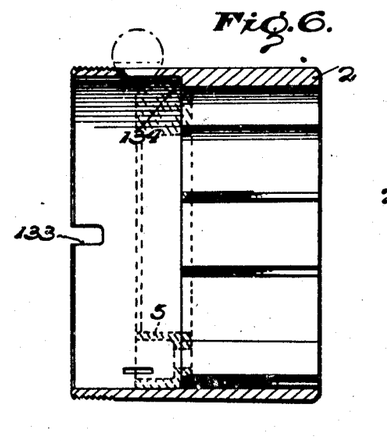
Fig. 6 is a view of one of the clutch parts.
Figure 7:
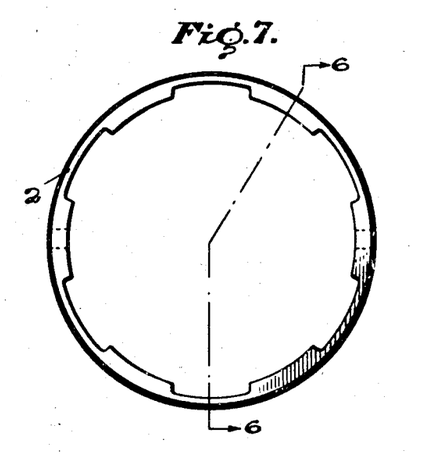
Fig. 7 is another view of the same clutch part.
Figures 10, 11:
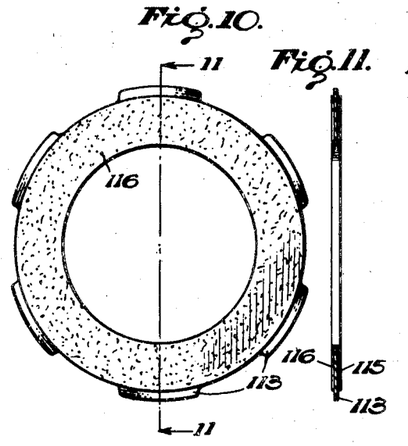
Fig. 10 is a view of one of the driving discs of the clutch assembly.
Fig. 11 is a view on line 11—11 of Fig. 10.
Figures 12, 13:
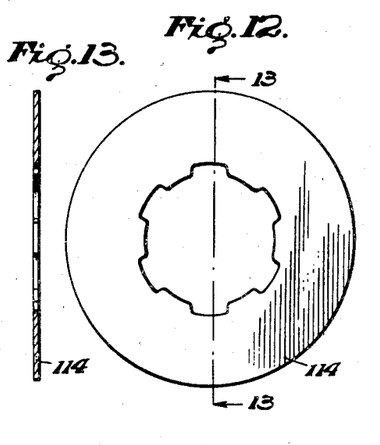
Fig. 12 is a view of one of the driven discs of the clutch assembly.
Fig. 13 is a view on line 13—13 of Fig. 12.
Figure 18:
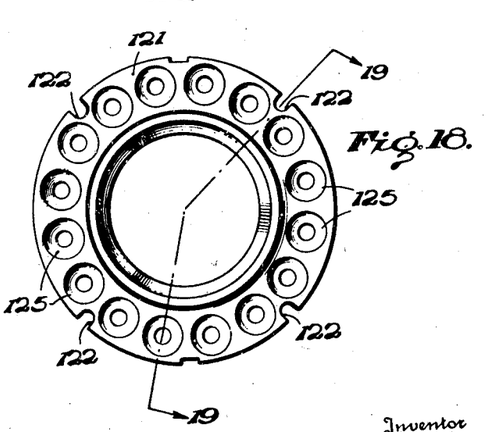
Fig. 18 is a view of the clutch abutment plate.
Figure 19:
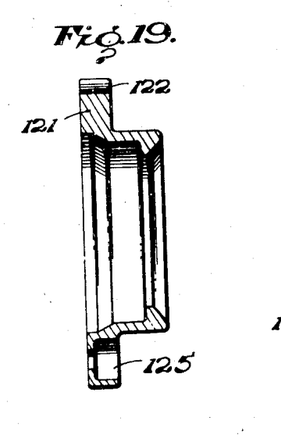
Fig. 19 is a view on line 19—19 of Fig. 18.

The embodiment illustrated includes a pair of driving units (Fig. 27), each having two stages of planetary gearing in series (Fig. 1) driving a barrel 1 which, in turn, drives sleeve 2 through a set of steel balls 3 and a cam plate 4 keyed to the sleeve 2. As shown best in Figs. 6 and 7, the inner surface of sleeve 2 is splined, and there is also an annular ledge or shoulder 134 at the ends of the splines, which shoulder engages a similar shoulder on an annular plate 5 having pockets to receive springs 124; there being similar pockets 125 (see Figs. 18 and 19) in an abutment plate 121 having notches 122 to receive pins 123 which hold the two spring receiving plates 5 and 121 against relative rotation. Torque transmitted from barrel 1 to cam 4 through the balls 3 tends to move cam 4 (See Fig. 21) as well as sleeve 2 to the left, whereupon shoulder 134 acts against spring plate 5, thereby relieving the pressure of the clutch springs on the clutch discs 113, 114; the discs 113 being coated with powdered metallic friction material which is bonded thereto, as shown at 115, 116 (see Fig. 11) while the discs 114 are uncoated, and disposed in interleaving engagement with discs 113. Normally the spring pressure on the clutch is considerably higher than required to transmit the drive from sleeve 2 (to which clutch discs 113 are splined) to sleeve 48 (to which clutch discs 114 are splined). The separating force of the balls 3 against the two cam surfaces is transmitted to plate 5 by way of shoulder 134 (Fig. 6) and thus relieves a part of this spring pressure, lowering the torque to the correct value. Should the coefficient of friction between clutch plates 113 and 114 increase for any reason, the torque required to slip the plates would also increase. This would produce a greater separating force of the balls, relieving more of the pressure of springs 124 upon the plates 113, 114 and thereby reducing the torque transmitted. A constant torque output results from this construction; that is, "slipping" will always occur at the same predetermined torque value (turning effort) regardless of the condition of the inter-engaged friction surfaces of the clutch.

Figures 4, 5, 25, 26:
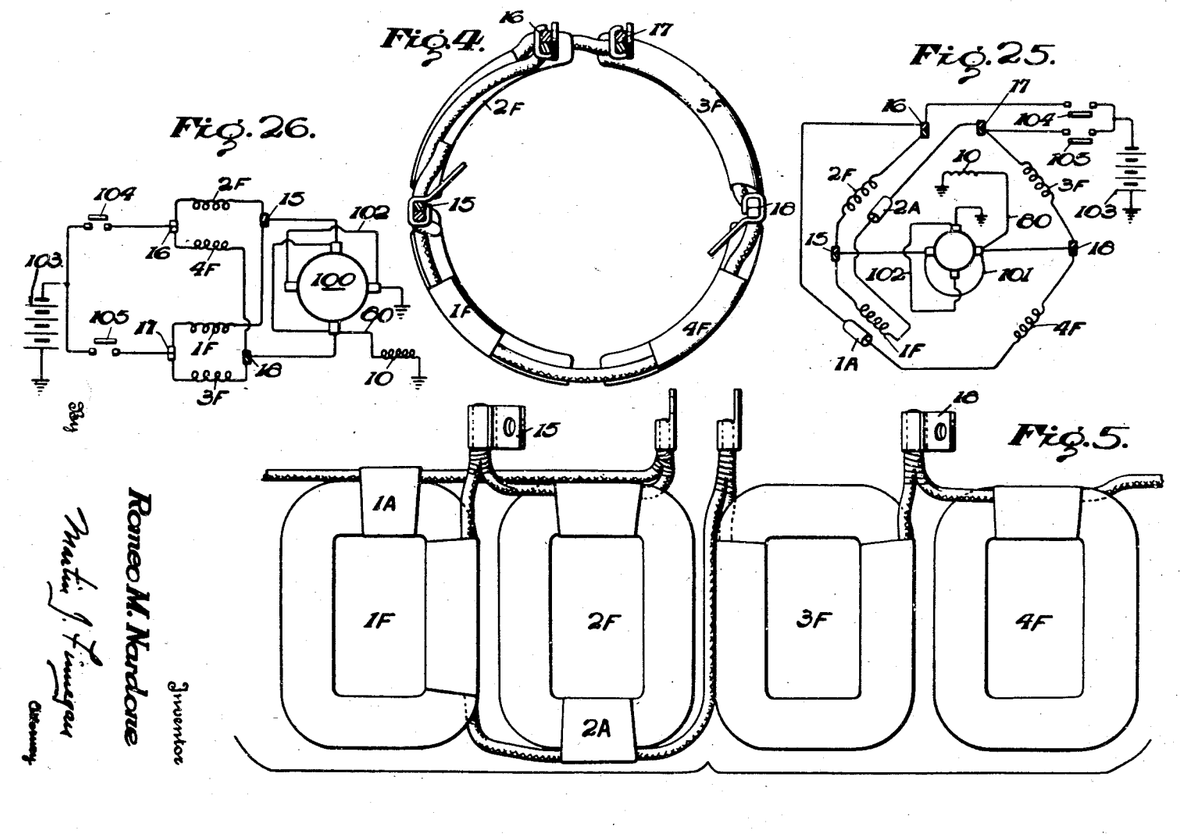
Fig. 4 is a view of the field coil assembly for one driving unit.
Fig. 5 is a view of said field coil assembly as it appears before installation.
Fig. 25 is a schematic illustration of the electrical connections for one driving unit.
Fig. 26 is a simplified schematic diagram of said electrical connections.

The driven shaft 6 (to which sleeve 48 is keyed) carries a movable jaw 7 mounted on and driven through the agency of balls mounted in a cage 8. Jaw 7 is caused to move to the left to engage a similar jaw on shaft 9 by the action of a solenoid 10. This solenoid is connected in the motor circuit as shown in Figs. 25 and 26, so that when the current is caused to flow to commutator 100 of the motor, the solenoid 10 also is energized to immediately engage the jaw 7 with the jaw 9. When the current is turned off, a spring 11 acts to separate the jaws and bring 7 back to its normal disengaged position.

The principal reason for the use of the normally disengaged clutch between the intermediate drive shaft 6 and the driven shaft 9 is to facilitate operation of the landing gear to which the shaft 150 (Fig. 27) is drivably connected, by either of the two units, 94 or 194, independently of the other, although both motors may, on any occasion when desired, be operated together, thus doubling the driving effort.

In addition to the use of the load-responsive cam mechanism above-described, the invention includes other features directed to the same general purpose of maintaining a smoothly operating, uniformly effective driving effort all the way from the armature shaft 21 to the load-engaging driven shaft 9. These other features are described in the paragraphs immediately following.

Figures 1, 20, 21, 22, 23, 24:
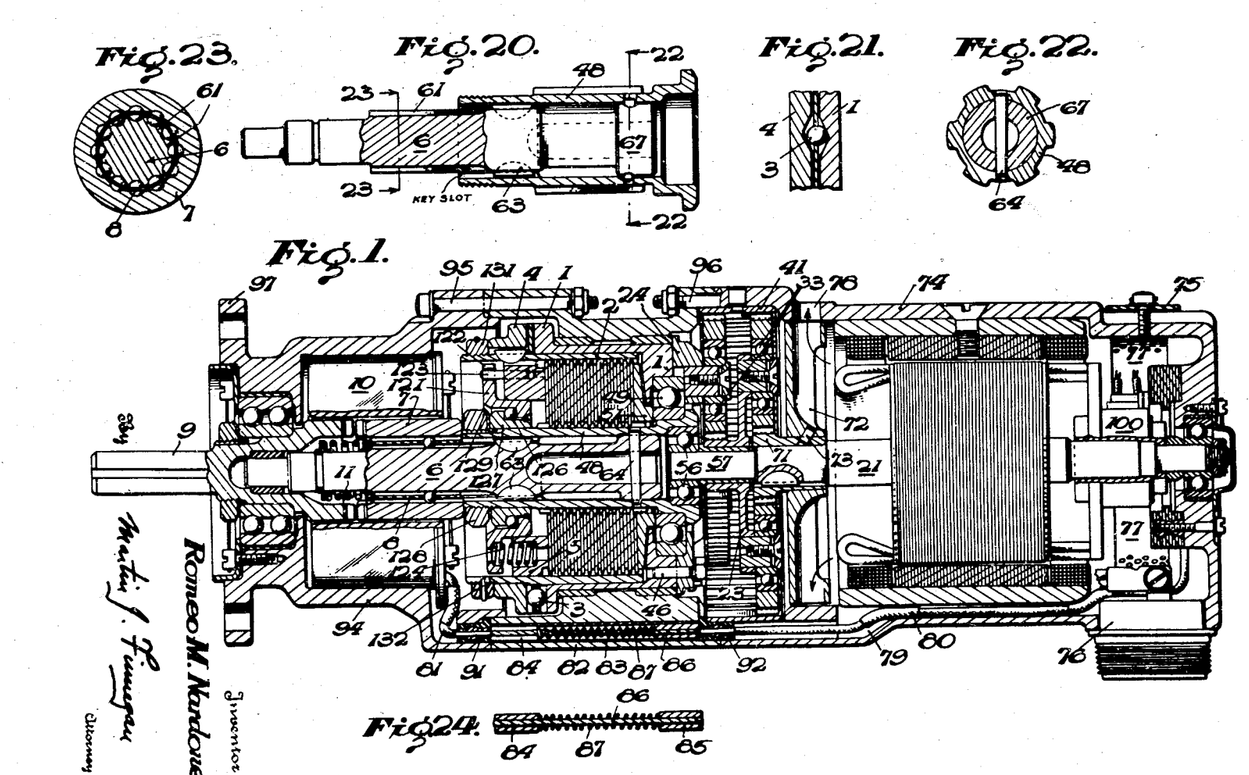
Fig. 1 is a longitudinal sectional view of one driving unit of the mechanism embodying the invention.
Fig. 20 is a view of the intermediate driveshaft.
Fig. 21 is a diagram illustrating the operation of the clutch pressure controlling means.
Fig. 22 is a view on line 22—22 of Fig. 20.
Fig. 23 is a view on line 23—23 of Fig. 20.
Fig. 24 shows a contact assembly.
Figure 2:
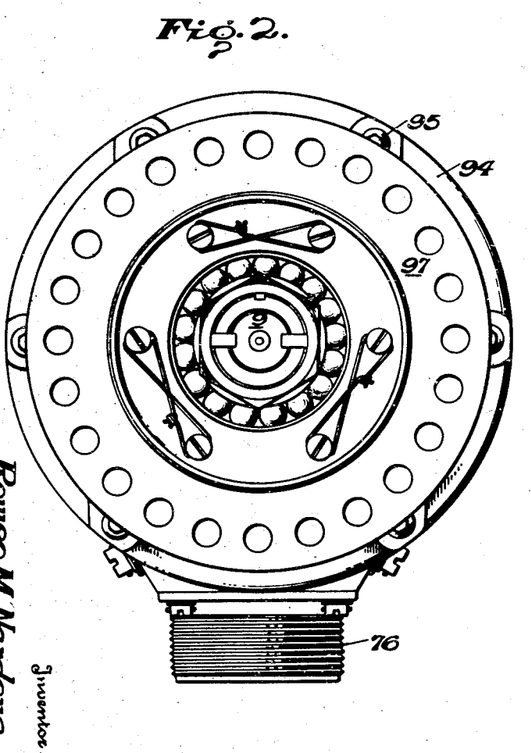
Fig. 2 is a view looking toward one end of the unit shown in Fig. 1.
Figure 3:
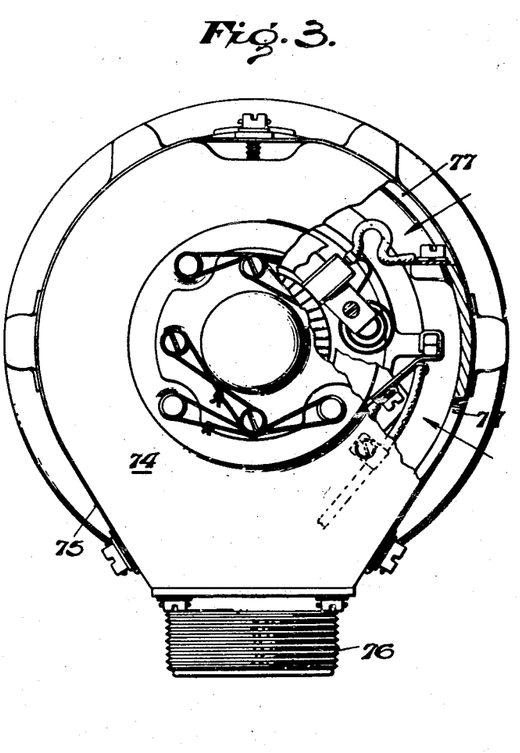
Fig. 3 is a view from the opposite end, with a part of the housing broken away.
Figures 8, 9:
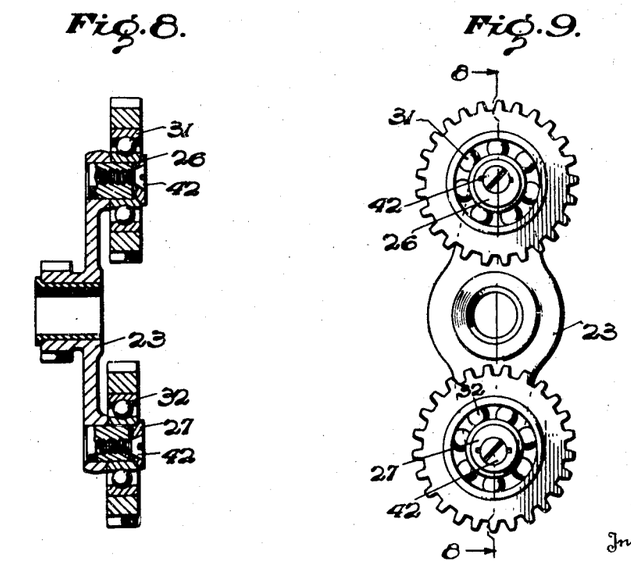
Fig. 8 is a sectional view on line 8—8 of Fig. 9.
Fig. 9 is a view of one of the planet assemblies.
Figure 14:
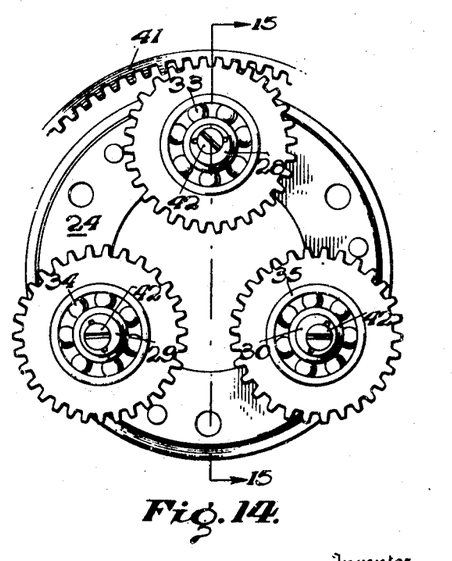
Fig. 14 is a view of the other planet assembly.
Figure 15:
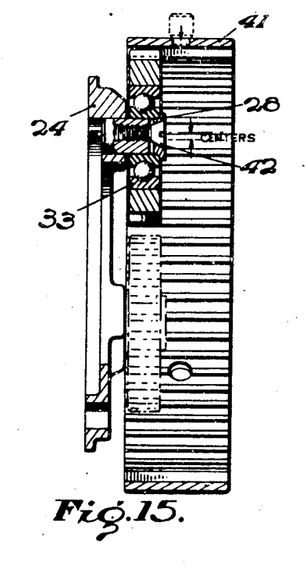
Fig. 15 is a view on line 15—15 of Fig. 14.

Each planet pinion of each of the two planetary gear sets receives a ball bearing assembly, and each ball bearing assembly is securely locked in concentric alignment with the mounting pin of the corresponding planet cage or carrier, one of which cages is designated by the reference character 23 in Figs. 1, 8 and 9, while the other is designated by the reference character 24 in Figs. 1, 14 and 15. As shown in Figs. 8, 9, 14 and 15, the method employed to insure and to maintain correct concentric relationship of each pinion to its axis of rotation, involves the provision of locking elements 26, 27, 28, 29 and 30 for the pinion bearings 31, 32, 33, 34 and 35, respectively, each of which locking elements is secured to its associated mounting pin by means of a screw which is received in both said locking element and mounting pin at a point which is eccentric to the common axis of said elements, and hence eccentric to the axis of rotation of the associated planet pinion; the eccentricity in each case being in a direction coinciding with a radial line drawn from the longitudinal axis of the planet cage to the central meshing point as between the associated planet pinion on the one hand and the common orbital gear 41 constituting the track about which the planet pinions revolve. By this method the maintenance of correct concentric relationship is assured, because the specified eccentricity of position of the attaching screws 42 effectively counteracts and defeats the tendency toward unscrewing which characterizes the mounting means commonly employed in the prior art in connection with the use of planetary sets of gears of the character herein employed.

Figure 16:
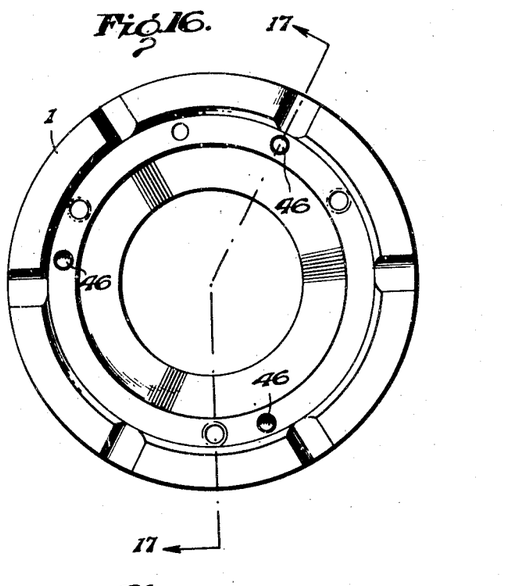
Fig. 16 is a view of the clutch barrel.
Figure 17:
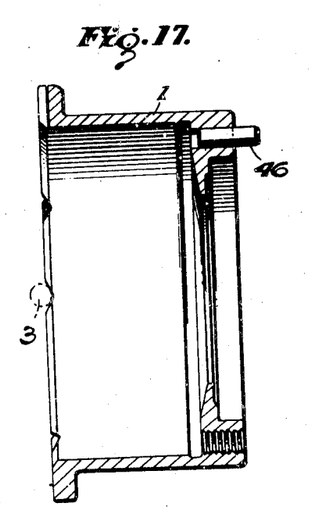
Fig. 17 is a view on line 17—17 of Fig. 16.

Another feature directed to the same general purpose, above-identified, is the use of the cage 24 for the planet pinions 33, 34 and 35 instead of directly mounting these planets on an end surface of the clutch barrel 1 as has been customary heretofore. By utilizing separate pieces of material from which to fashion the planet cage 24 on the one hand and the end of the clutch barrel 1 on the other, and by thereafter uniting one to the other by the dowel method indicated at 46 in Figs. 1, 16 and 17, the accurate machining of each part is facilitated and a more precise concentric relationship is thereby assured, particularly in that this divided arrangement permits the use of a ball bearing assembly between the elements 24 and 1 on the one hand and the sleeve portion 48 of the intermediate drive shaft 6 on the other; such ball bearing assembly being indicated at 49 in Fig. 1 as located by and between cooperating circular shoulders on the elements 1 and 48, respectively, which location is rendered even more precise by the positioning of the clutch sleeve 2 in such manner that its hub portion 51 is in full registry with the end face of the inner race of the bearing assembly 49. The use of this construction also facilitates precise concentric location of the entire gear train because the same shouldered portion of the sleeve 48 provides an annular space in which the ball bearing assembly 56 may be received, which assembly in turn constitutes concentric supporting means for the reduced end portion 57 of the armature shaft 21 and thus assures that the two sections of the gear train, through which the said armature shaft extends, will be held in correct alignment with the bearing assemblies 49 and 56 as well as with the sleeve 48 of the intermediate drive shaft 6.

True alignment between the sleeve 48 and the shaft 6 is assured by provision of semi-circular keys 63 fitting in diametrically opposed slots milled in the shaft 6, and a transversely disposed taper pin 64 (see Fig. 22) passing completely through the head portion 67 of the shaft 6 which terminates at a point within the bearing assembly 49, which latter fact also contributes to the preservation of a true concentric relationship and precise driving alignment of the parts.

Precise driving alignment and uniformly maintained driving effort are further assured by the use of the ball containing cage 8 above referred to, the said cage being interposed (see Fig. 23) between the splined portion 61 of the shaft 6 and the correspondingly splined and axially shiftable clutch element 7, whose axial shift is brought about by reason of its constituting a part of the magnetic circuit which results from the passage of current through the winding of the solenoid 10. If the connection between the shaft 6 and the clutch element 7 were of the conventional splined type it would require a relatively greater amount of axially directed force to produce axial movement simultaneously with transmission of torque from the element 6 to the element 7; and the incorporation of a structure sufficient to produce such a powerful axially directed force would present a very difficult problem. This problem has been solved by the use of the ball-containing cage 8, and by the positioning of the balls therein in such relation to the recesses in members 6 and 7 (see Fig. 23) as to produce a maximum of assistance to the smooth transmission of the driving effort from the part 6 to the part 7.

The driving motor is of the direct current type, with field windings in shunt relationship to each other, but in series relationship to the armature winding, the latter being indicated in Figs. 25 and 26 by its commutator terminus, shown at 100. Solenoid 10 is shown as connected in a parallel branch 80 of the motor circuit, and in Fig. 1 conductor 80 is shown as located completely within the motor housing 74, along its inner surface, and adapted to connect electrically with solenoid lead 81 by way of an intermediate automatic connector shown best in Fig. 24, and including a flexible lead 86 anchored at either end in bushings 84, 85 of conducting material and urged into good electrical contact with conductor terminals 91, 92, respectively, by the action of a spring 87; the lead 86 being of slightly greater length than the actual distance between the facing ends of housing sections 74 and 94 so as to assure maintenance of axial pressure on bushings 84 and 85 by the action of spring 87, and hence good contact with the inner metallic cores of the terminals 91 and 92, respectively.

In assembling the complete mechanism the terminal 91 is installed before attachment of housing section 82 to housing section 94 by bolts 95. After housing section 94 has been attached, automatic connector assembly 86 is then inserted in insulating tube 83, after which housing section 74 is attached; and as bolts 96 are made fast the electrical connection of members 92 and 85 is automatically established.

The actual physical arrangement of the field coil connections is simulated in Figs. 4, 5 and 25, while Fig. 26 shows the same connections in more schematic fashion, in order to show more clearly the different paths for current flow, depending upon which of the two directional switches 104, 105 is in closed position.

Closure of switch 105 energizes field coils 1F and 3F, (and, of course, the armature windings 100 as well as the winding of solenoid 10), and this energization of the field coils 1F and 3F produces rotation of the motor in the direction corresponding to the direction of the windings 1F and 3F in relation to the armature circuit. Conversely, closure of switch 104 produces rotation of the motor in the opposite direction by reason of the opposite direction of winding of the field coils 2F and 4F which are in circuit only with the switch 104, although in series relation to the armature and solenoid windings. In other words, the solenoid winding 10 is energized whenever either of switches 104 and 105 is in the closed position, and therefore the jaw clutch 7 is moved to the engaged position whenever the motor is energized whether for clockwise or for counterclockwise rotation. As soon as the motor circuit is broken the spring 11 is effective to return the clutch member 7 to the disengaged position indicated in Fig. 1, as the current flow to the solenoid 10 is interrupted simultaneously with the opening of the switch 104 or 105, as the case may be.

Fan 72 serves to cool the motor by drawing cooling air through openings 77 in the motor housing, and discharging the air through openings 78. Perforations in shielding strap 75 register with these openings 77, to permit the air to enter, but without impairing the radio-shielding properties of the strap.

The abutment plate 121 is held against axial displacement by a novel assembly of thrust absorbing elements including a locking ring 129 of novel construction interposed between ball-race 127 and nut 128. This ring 129 has an inner tab fitting into a slot in sleeve 48 and outer tabs that are bent over the outer surface of nut 128; the combined effect of the tabs being to hold the assembly against movement either angularly or axially.

The exposed portion of driven shaft 150 (Fig. 27) is adapted to receive a lever connecting directly with the landing gear (not shown) and therefore said shaft 150 is under load from the weight of the landing gear, in all positions except when the gear is fully extended in landing positions. The shaft 9 of unit 94—and the same is true of unit 194—slips into, and drives, a pinion 201; each of said pinions 201 being separately mounted in ball bearing assemblies 202 supported on the bosses 203, 204 which carry the units 74, 174, respectively. Each unit may thus be readily removed for servicing or replacement.

Figure 27:
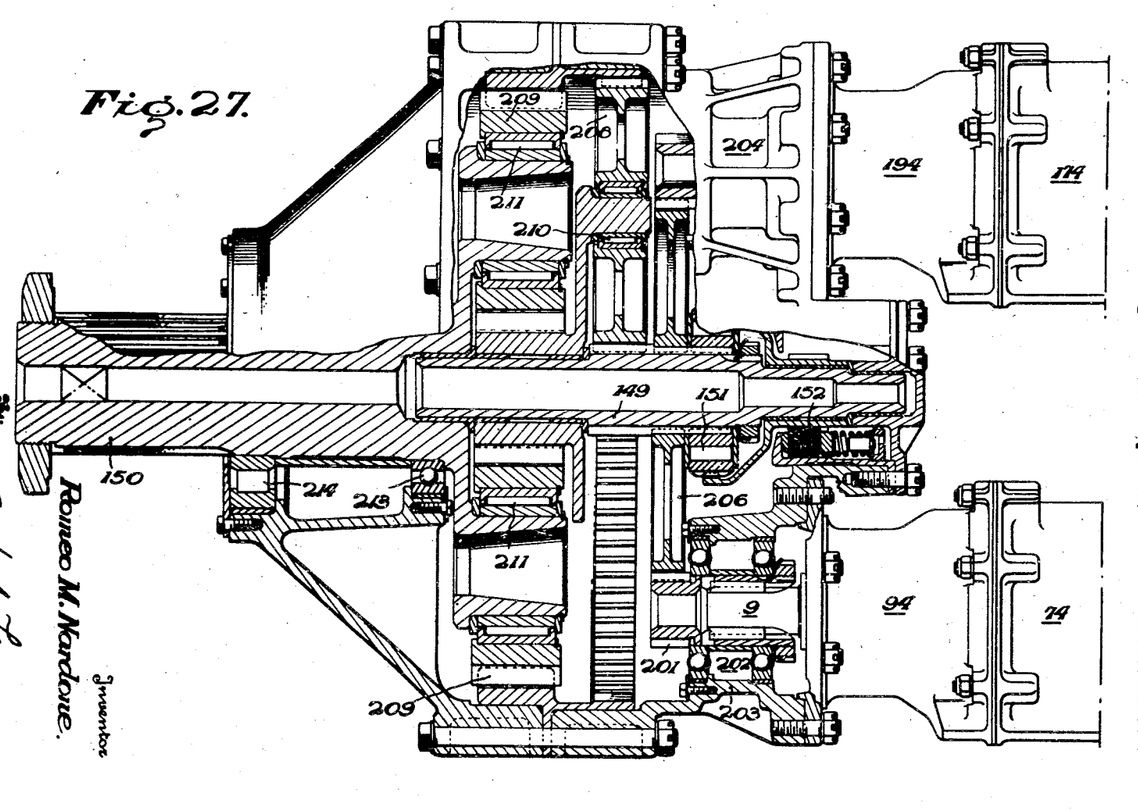
Fig. 27 shows the manner of mounting two driving units, and the connections therefrom to a landing gear.

The two pinions driven by the units 74, 174 mesh with and drive a large gear 206 on a central shaft 149. A pinion on this shaft 149 drives a double planetary gear reduction set (208, 209) to the output shaft 150 of the mechanism. The planet gears (208, 209) of both planetary sets are mounted on roller bearings (210, 211). The output shaft 150 is mounted on ball and roller bearing assemblies (213, 214).

The central shaft 149 also carries an overrunning roller clutch 151, through which a multiple disc brake 152 is driven. This brake 152 holds the landing gear (not shown) in the retracted position, or in any intermediate position in which it may be stopped. The roller clutch 151 permits the motor to raise the landing gear freely, without the brake 152 being turned, but renders the brake effective as soon as the motor 74 (or 174) is stopped. The motor, however, turns the brake while lowering the landing gear, thus controlling its speed of descent.

This application is a division of my application Serial No. 459,550, filed September 24, 1942.

What is claimed is:

1. A mechanism comprising a reversible electric motor having an armature winding and four field coils, each disposed with its axis ninety degrees removed from the adjacent coils on either side thereof, and all being in concentric relationship to the armature, a source of direct current, means for connecting said coils to said source of direct current so as to energize two only of said coils at any one time, each of said two coils positioned with its axis one hundred and eighty degrees apart from the other of said two coils, and said two coils wound oppositely to the other two, said energizing means including conductors connecting said coils in parallel circuit relationship to each other, but in series with said armature winding, and said two energized field coils so positioned in relation to the other two de-energized field coils that said other two field coils serve as the opposite pole for said energized field coils.

2. Landing gear operating mechanism comprising a reversible electric motor having an armature winding and four field coils, each disposed with its axis ninety degrees removed from the adjacent coils on either side thereof, all of said field coils being positioned in concentric relationship to the armature, a source of direct current, means for connecting said source of direct current to two of said coils for effecting rotation of said armature in one direction, said two coils being positioned at diametrically opposite sides of said armature, said last mentioned two coils being wound oppositely to the other two coils, means for connecting said source to the other of said two coils for effecting rotation of said armature in a second direction, pole members for each of said field coils, the pole members of one pair of coils so arranged in relation to the pole members of the other pair that upon energization of one pair of coils by said direct current the pole members of the other pair serve as the opposite pole for the magnetic flux from the energized pair of coils.

3. Landing gear operating mechanism comprising a reversible electric motor having an armature winding and four field coils, each disposed with its axis ninety degrees removed from the adjacent coils on either side thereof, all of said field coils being positioned in concentric relationship to the armature, a source of direct current, means for selectively connecting said source so as to energize only two of said coils at a time for effecting rotation of said armature in one direction, said two coils being positioned at diametrically opposite sides of said armature, said last mentioned two coils being wound oppositely to the other two coils, and energization through said selective means of said other two coils effecting rotation of said armature in an opposite direction, a solenoid connected in series relation to all of said field coils for connection of said source through said selective means, and jaw means controlled by said solenoid for placing said electric motor in operative driving relation upon energization of any one of said pairs of field coils.

ROMEO M. NARDONE.

REFERENCES CITED

The following references are of record in the file of this patent:

UNITED STATES PATENTS

| Number | Name | Date |
|---|---|---|
| 1,858,571 | Barrett | May 17, 1932 |
| 2,085,442 | Newell | June 29, 1937 |
| 616,673 | Kennedy | Dec. 27, 1898 |
| 1,070,647 | Whittingham | Aug. 19, 1913 |
| 1,851,591 | Parvin | Mar. 29, 1932 |
| 858,097 | McCormick | June 25, 1907 |
| 1,343,221 | Mills | June 15, 1920 |
| 2,137,721 | Jones | Nov. 22, 1938 |